US012764838B2

(12) United States Patent
Cashman et al.

(10) Patent No.: US 12,764,838 B2
(45) Date of Patent: Oct. 13, 2026

(54) MICROWAVE SYSTEM

(71) Applicant: Cibus Wave LLC, Ponte Verde Beach, FL (US)

(72) Inventors: Daniel Cashman, Sunbury, OH (US); Richard Cashman, Westerville, OH (US)

(73) Assignee: Cibus Wave LLC, Ponte Vedra Beach, FL (US)

(*) Notice: Subject to any disclaimer, the term of this patent is extended or adjusted under 35 U.S.C. 154(b) by 509 days.

(21) Appl. No.: 18/366,648

(22) Filed: Aug. 7, 2023

(65) Prior Publication Data

US 2023/0389142 A1 Nov. 30, 2023

Related U.S. Application Data

(63) Continuation of application No. 16/740,820, filed on Jan. 13, 2020, now Pat. No. 11,723,120, which is a (Continued)

(51) Int. Cl.
*H05B 6/66* (2006.01)
*A23L 5/10* (2016.01)
(Continued)

(52) U.S. Cl.
CPC ................ *H05B 6/666* (2013.01); *A23L 5/10* (2016.08); *H05B 6/6402* (2013.01); *H05B 6/701* (2013.01);
(Continued)

(58) Field of Classification Search
CPC .... G06F 3/04883; G06F 3/04886; A23L 5/10; A23L 5/15; H05B 6/6402; H05B 6/666; H05B 6/701; H05B 6/707; H05B 6/78; H05B 6/782; H05B 6/804
USPC ........ 219/701, 700, 678–684, 690–693, 698, 219/738, 752, 753, 754, 762, 757, 729, 219/742, 744
See application file for complete search history.

(56) References Cited

U.S. PATENT DOCUMENTS

| | | | |
|---|---|---|---|
| 9,552 | A | 1/1853 | Bell |
| 3,466,415 | A | 9/1969 | Bleackley |

(Continued)

FOREIGN PATENT DOCUMENTS

| | | | |
|---|---|---|---|
| JP | 2009301647 | A | 12/2009 |

OTHER PUBLICATIONS

Strauss, S, "Microwaving destroys nutrients, study finds", Globe and Mail, Oct. 17, 2003, 3 pages, ontariotenants.ca.

(Continued)

*Primary Examiner* — Quang T Van
(74) *Attorney, Agent, or Firm* — C. Tumey Law Group PLLC

(57) ABSTRACT

A system for applying microwave energy to a product in which a conveyor extends through a central portion of a cavity having a pair of opposing sidewalls. The conveyor is supported directly or indirectly by a plurality of support elements attached to and between the sidewalls. The system includes top and bottom waveguides directing microwave energy toward the conveyor, and provides for attachment blocks surrounding the support elements and fastened to a support sheet on which the conveyor is conveyed. Contact strips can be used to reduce conveyor friction.

20 Claims, 10 Drawing Sheets

Related U.S. Application Data continuation of application No. 14/954,419, filed on Nov. 30, 2015, now Pat. No. 10,536,996, which is a continuation of application No. 13/050,188, filed on Mar. 17, 2011, now Pat. No. 9,204,501.

(60) Provisional application No. 61/314,661, filed on Mar. 17, 2010.

(51) Int. Cl.
*H05B 6/64* (2006.01)
*H05B 6/70* (2006.01)
*H05B 6/78* (2006.01)
*H05B 6/80* (2006.01)

(52) U.S. Cl.
CPC ............... *H05B 6/707* (2013.01); *H05B 6/78* (2013.01); *H05B 6/782* (2013.01); *H05B 6/804* (2013.01); *A23L 5/15* (2016.08)

(56) References Cited

U.S. PATENT DOCUMENTS

| | | | | |
|---|---|---|---|---|
| 3,476,904 | A | 11/1969 | Schroeder | |
| 3,699,899 | A | 10/1972 | Schiffmann et al. | |
| 4,198,554 | A | 4/1980 | Wayne | |
| 4,246,462 | A | 1/1981 | Meisel | |
| 4,458,128 | A | 7/1984 | Chabinsky | |
| 4,570,045 | A | 2/1986 | Jeppson | |
| 4,800,090 | A | 1/1989 | August | |
| 4,808,782 | A * | 2/1989 | Nakagawa ............. | B01J 19/126 219/730 |
| 5,160,819 | A | 11/1992 | Ball et al. | |
| 5,512,312 | A | 4/1996 | Forney et al. | |
| 5,527,396 | A | 6/1996 | Saitoh et al. | |
| 6,717,120 | B2 * | 4/2004 | Fritts ...................... | H05B 6/782 219/700 |
| 7,026,588 | B2 * | 4/2006 | Delmotte ............... | H05B 6/688 219/693 |
| 8,981,268 | B2 | 3/2015 | Lee | |
| 2002/0088800 | A1 | 7/2002 | Miller | |
| 2007/0068939 | A1 | 3/2007 | Harris | |
| 2008/0059680 | A1 | 3/2008 | Hiew et al. | |
| 2010/0263328 | A1 | 10/2010 | Dorsey et al. | |
| 2019/0297922 | A1 | 10/2019 | Takeda et al. | |

OTHER PUBLICATIONS

O'Connor, A, "The Claim: Microwave Ovens Kill Nutrients in Food", The New York Times, Oct. 17, 2006, 1 page, nytimes.com.

* cited by examiner

MICROWAVE SYSTEM

CROSS-REFERENCE TO RELATED APPLICATIONS

This application is a continuation of and claims priority to U.S. application Ser. No. 16/740,820 filed 13 Jan. 2020 now issued U.S. Pat. No. 11,723,120, which claims priority to U.S. application Ser. No. 14/954,419 filed on Nov. 30, 2015 now issued U.S. Pat. No. 10,536,996, which claims priority to U.S. application Ser. No. 13/050,188 filed on Mar. 17, 2011 now issued U.S. Pat. No. 9,204,501, which claims priority to U.S. Application No. 61/314,661 filed on Mar. 17, 2010, all of the foregoing of which are herein incorporated by reference in their entirety.

TECHNICAL FIELD

The exemplary embodiments herein generally relate to systems and methods for applying microwaves to various products including but not limited to foodstuff.

BACKGROUND OF THE ART

During the production of many products it is often desirable to heat the product. In some cases the heat may be applied in order to disinfect the product, pre-cook the product, and/or remove water content from the product. While there are many methods for applying heat to a product (boiling, convection, conduction, steam, etc.), for several reasons it may often be desirable to use microwaves as the method for heating the product. As is known in the art, applying microwave energy causes polarized molecules to quickly move in order to align with the oscillating microwave. This quick movement causes the molecules to heat up, also known as dielectric heating.

While others have attempted to apply microwave energy to products in a uniform and repeatable manner, attempts thus far have fallen short. Previous systems and methods have been unable to match the microwave energy with the product so that there is uniform heating. Previous techniques have produced uneven heating due to the non-uniform distribution of microwave energy inside the oven. Some oven designs produce ‘hot’ spots and ‘cold’ spots which receive microwave energy in different amounts. Typically, the composition and geometry of the product creates problems for previous designs. Most notably, the thickness or depth of the product can produce situations where the outer layer has been heated while the interior remains at a lower temperature. Previous designs have attempted to apply more microwave energy in order to reach the interior of the product. However, because microwaves are by-design non-uniform, the problem is only amplified when more microwave energy is applied to the product.

Previous designs have used antennas or other ‘stirring devices’ which were designed to spread the microwave energy waves throughout the oven, mostly in a random scattering-type manner. It has been found that these techniques are not very controllable or uniform in their application of microwave energy to a given product.

SUMMARY OF THE EXEMPLARY EMBODIMENTS

An exemplary embodiment uses a microwave oven which applies microwave energy directly to the products in a uniform, controlled, and repeatable manner. The design of an exemplary oven allows all of the microwave energy to be absorbed by the food and does not allow microwave energy to be absorbed by containers or the interior of the oven, or escape from the oven itself. Thus, the ovens operate at a very high efficiency. The interior of the oven cavities may be completely flat and square so that no welds or protrusions can attract or absorb microwave energy or disrupt the flow of energy waves within the oven.

An exemplary system and method may use a plurality of exemplary ovens in series with relaxation sections in between each oven. A conveyer may be designed for each oven so that the speed at which the products move through each oven can be precisely controlled and matched with the microwave energy input that each oven is providing. An exemplary system may also use trays to contain the products so that a consistent orientation (and thickness) of the products can be maintained throughout the process to ensure uniform heating. The conveyer and the trays may be comprised of a non-lossy material which will not absorb the microwave energy. This prevents the conveyer and trays from being damaged after continued use and helps to ensure that the products absorb all of the microwave energy within the oven (i.e. helps to maximize efficiency and control over the process).

The foregoing and other features and advantages of the exemplary embodiments will be apparent from the following more detailed description of the particular embodiments of the invention, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

Figure 1:
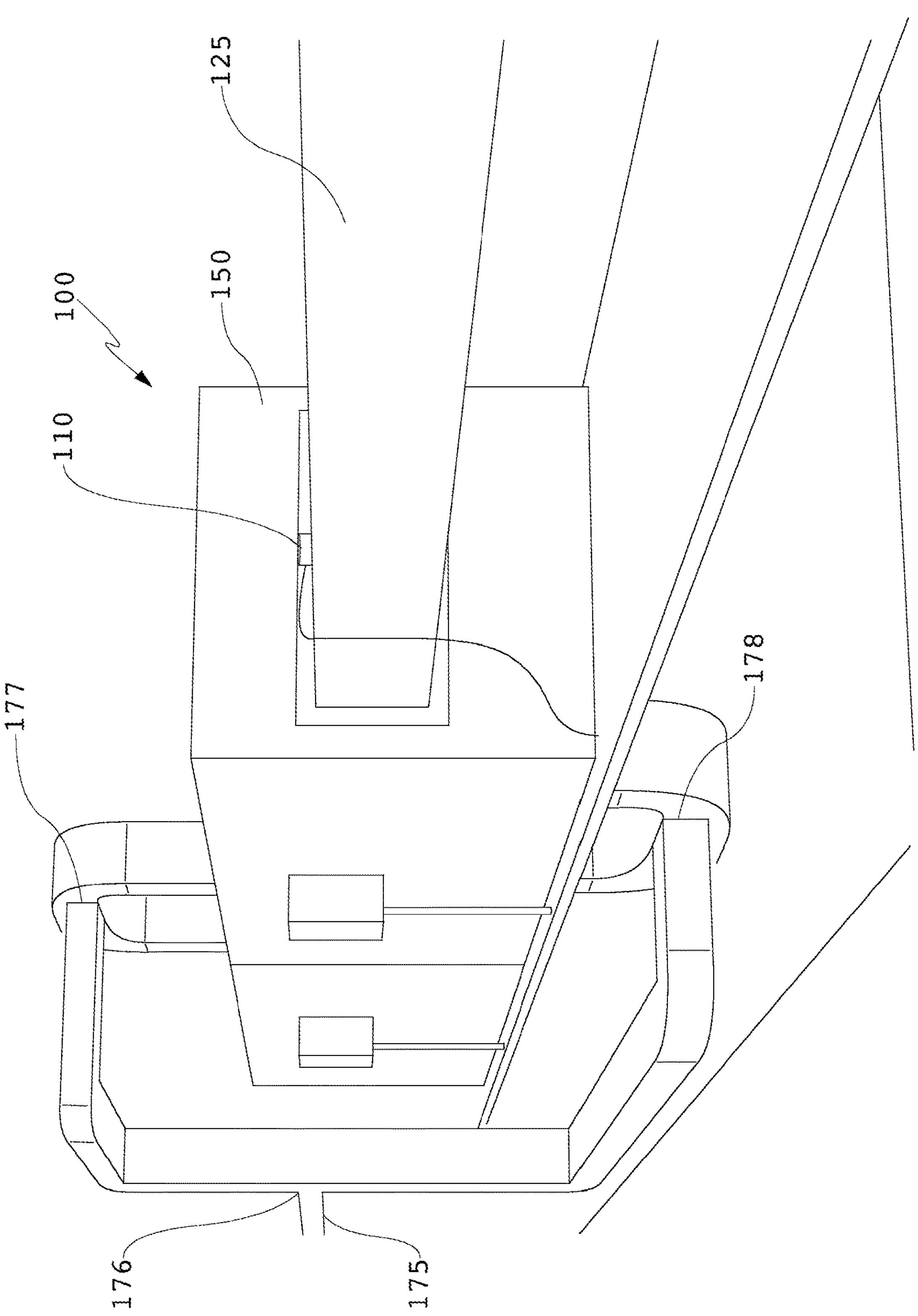
FIG. 1 is a perspective view of the exterior of an exemplary oven.

FIG. 1 shows an exemplary oven 100. The oven cavity 150 provides an enclosure around the conveyer. A tunnel 125 is shown connecting to the oven cavity 150. It is preferable that the tunnel 125 and the oven cavity 150 are completely enclosed so that contaminates cannot enter/exit the tunnel 125 or oven cavity 150. It may also be preferable to construct the tunnel 125 with a substantially smaller (50% or less) cross-sectional area than the oven cavity 150. When a tunnel 125 is provided with a smaller cross-section than the oven cavity 150, the stray energy waves may have difficulty entering the tunnel 125 and thus may stay contained within the oven cavity 150. One or more photo-eye, laser detection, RFID, or other means 110 for detecting the presence of product on the conveyer may be used at the connection between the tunnel 125 and oven cavity 150 in order to detect the presence of product within the tunnel 125 and/or oven cavity 150. A primary wave guide 175 carries the electromagnetic radiation from a source (typically one or more magnetrons) to the oven cavity 150. In this embodiment, the primary wave guide 175 is split a total of four times. A first split 176 establishes a top waveguide to supply the top area of the oven cavity 150 and a bottom waveguide to supply and bottom area of the oven cavity 150. A second split 177 divides the top waveguide into two waveguides so that two separate points on the top of the oven may accept microwave energy. A third split 178 divides the bottom waveguide into two waveguides so that two separate points on the bottom of the oven may accept microwave energy.

It may be preferable to arrange the waveguides so that the microwave energy is divided evenly each time there is a split. Thus, the energy is split roughly in halves which are then directed down each new waveguide. In this fashion, each point where the waveguide intersects the oven may preferably supply the same amount of microwave energy into the product. For the embodiment shown in FIG. 1, each point (two on top and two on bottom) should preferably supply the oven with ¼ of the total energy traveling in the source waveguide 175. It has been found that applying microwave energy directly to the product in smaller, controlled portions allows the product to accept the energy in an even and predictable manner without overheating. Of course, the waveguides could be split into many separate waveguides (3 or 4 or more on the top and 3 or 4 or more on the bottom of the oven) to apply the energy to many different points on the top and bottom of the oven. However, the embodiment shown in FIG. 1 has been found to be successful without requiring these overly complex oven and/or waveguide designs.

Figure 2:
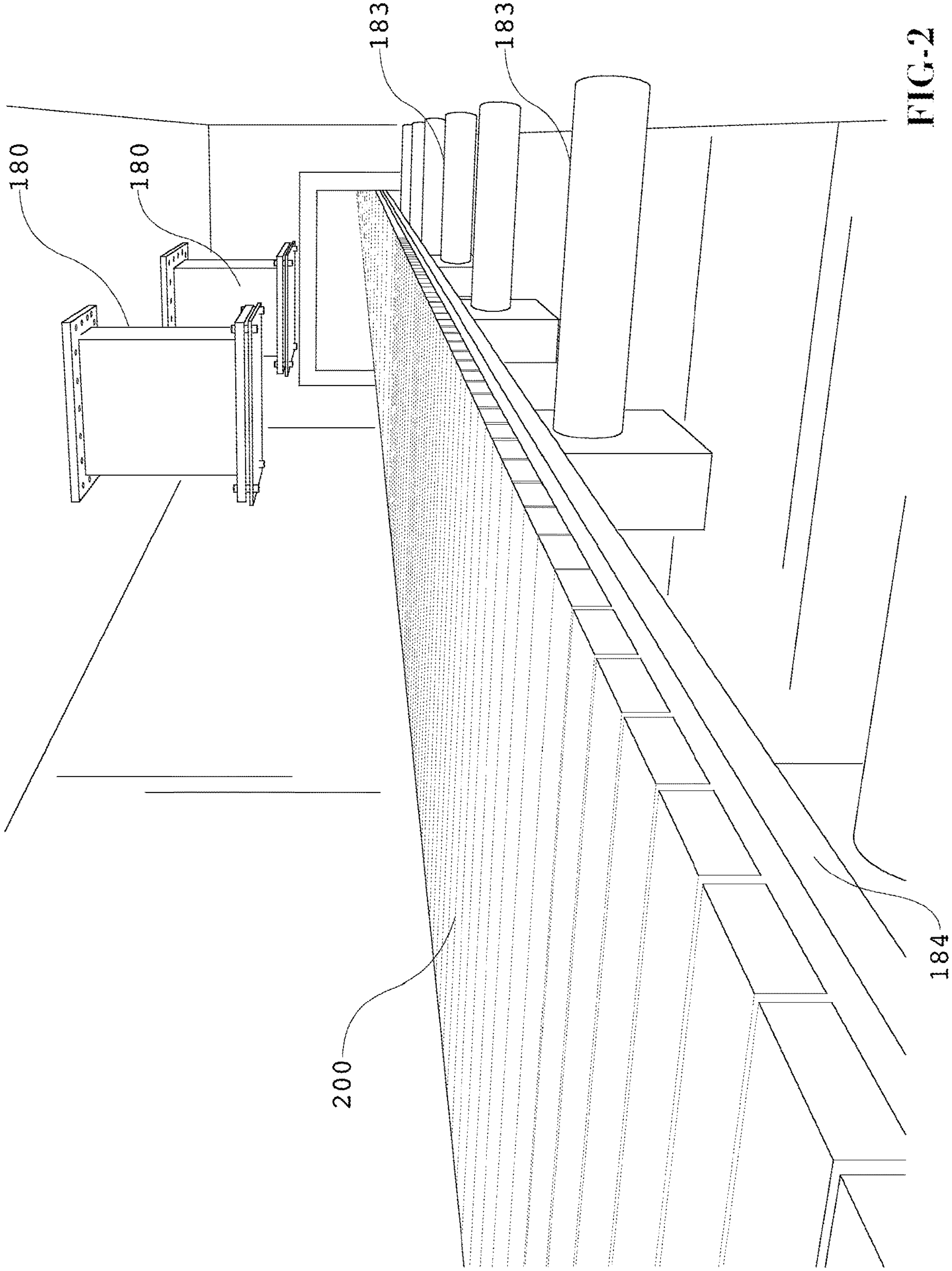
FIG. 2 is a perspective view of the interior of an exemplary oven.

FIG. 2 is a perspective view of the interior of an exemplary oven. A plurality of support elements 183 are shown running horizontally across the central portion of the oven. A conveyor support sheet 184 may rest on the support elements 183 and may support the conveyor 200. In some embodiments the conveyor 200 may sit directly on the conveyor support sheet 184. In other embodiments, a pair of contact strips (not shown) may be placed between the conveyor 200 and the conveyor support sheet 184 to reduce the surface area that the conveyor 200 contacts, preferably allowing it to slide adjacent to the support sheet 184 easier. The optional contact strips could also be of a different material than the support sheet or may be particularly selected as a material having a low friction coefficient.

The support elements 183 are preferably rigid members which can support the weight of the conveyor 200, conveyor support sheet 184, as well as any containers and product that travels through the oven. Preferably, the support elements 183, conveyor 200, and conveyor support sheet 184 are constructed with non-lossy material which will not absorb the microwave energy. Some types of polycarbonate plastic or polypropylene plastic are known in the industry to provide non-lossy properties in microwave energy environments. However, it has been found that some of the elements do not require non-lossy material. For example, the support elements 183 may be metallic, which may provide the structural rigidity necessary to support the conveyor. To minimize the impact on the microwave energy fields, the support elements may have a circular, tubular, or otherwise rounded (lacking sharp edges) cross-section and may be fused to the sidewalls of the oven (rather than welding, because welds have been found to disrupt the microwave energy patterns within the oven). Using a circular or tubular cross-section also reduces any corners or edges (which have also been found to disrupt the microwave energy patterns).

The waveguides 180 penetrate into the interior of the oven and provide an exit for the microwave energy at a point relatively close to the conveyor 200. In other words, the waveguides 180 continue to guide the microwave energy within the interior of the microwave cavity and preferably do not release the energy until the mouth of the waveguide is within the central portion of the microwave cavity. In this figure, a pair of waveguides 180 penetrate through the top of the oven and cease above the conveyor 200. For this embodiment, a matching pair of waveguides (not shown) penetrate through the bottom of the oven and cease just below the conveyor 200.

Figure 3:
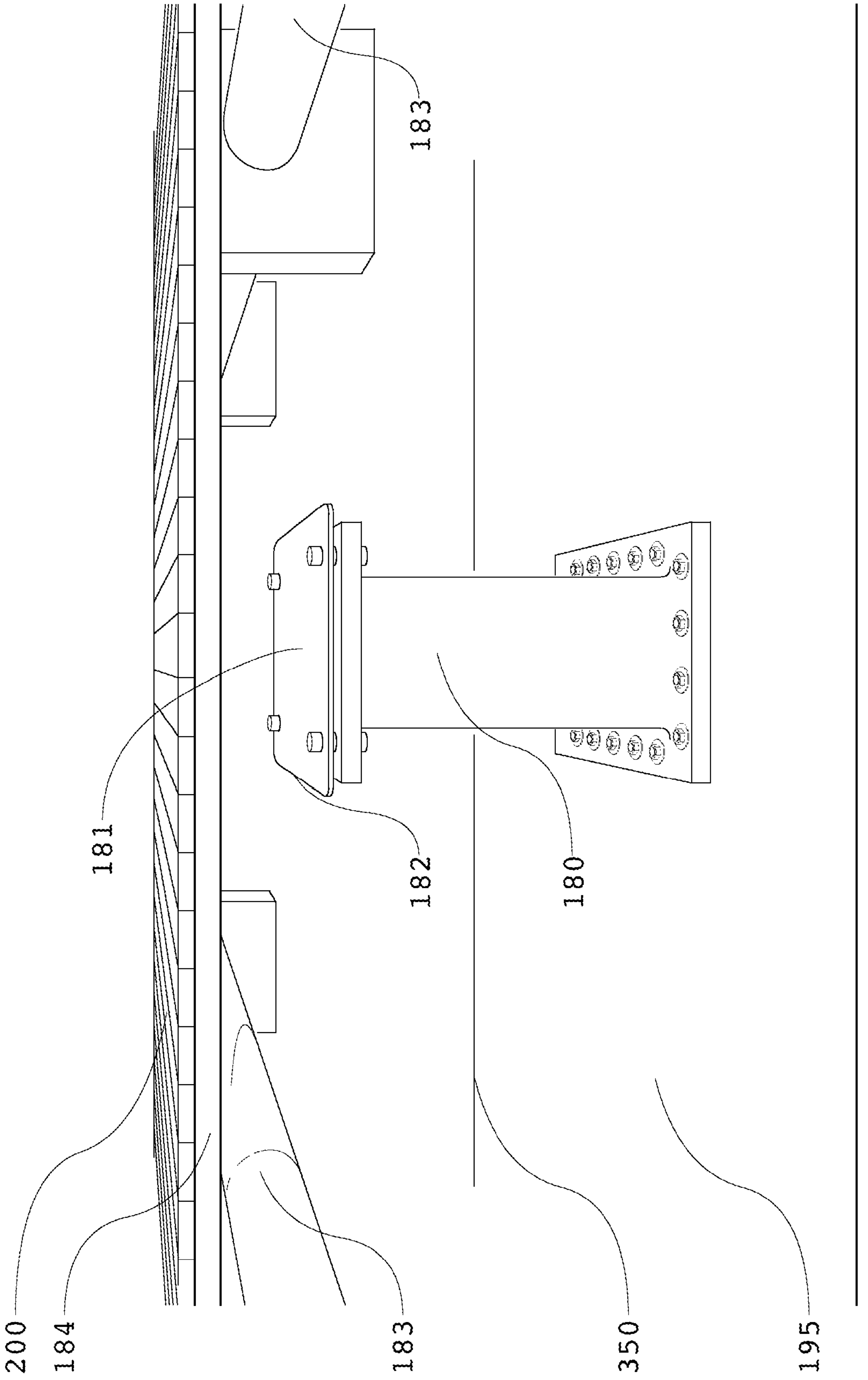
FIG. 3 is a perspective view of the interior of an exemplary oven showing the placement of a waveguide within the bottom of the oven and the location of the conveyor.

FIG. 3 is a perspective view of the interior of an exemplary oven showing a waveguide 180 penetrating the bottom of the oven cavity and ceasing just below the conveyor support sheet 184 and conveyor 200. The mouth 181 of the waveguide 180 may be covered with a protective waveguide cover 182 so that particulate cannot drop into the waveguide 180. The waveguide cover 182 may be constructed of a non-lossy material and may be attached over the mouth 181 of the waveguide 180 using fasteners constructed of a non-lossy material, or any other fastening means (adhesive, snap fit, interference fit, etc.). This figure also shows an interior edge seam 350. An exemplary oven may be designed such that these edges are near right-angles and lack welding and or fasteners (so that they do not disrupt the microwave energy waves). See FIG. 6 below which discusses these seams in detail.

As can be observed in the figure, this embodiment places the mouth 181 of the waveguide 180 in relatively close proximity to the conveyor 200 or within the central portion of the microwave cavity. In some embodiments, the portion of the conveyor support sheet 184 which is directly over the mouth 181 may be removed (see FIG. 4). Preferably, the mouth 181 of the waveguide 180 is located away from any materials or structures which could disrupt the microwave energy fields. Here, the mouth 181 of the waveguide 180 is located away from the bottom of the oven 195, top of the oven, sides of the oven, and is placed equidistant between two supporting elements 183. Thus, in this embodiment the microwave energy has a direct path to the product (not shown) on the conveyor (with the exception of the optional waveguide cover 182 and the conveyor 200 itself which should preferably be constructed of materials which only minimally affect the microwave energy, if at all). No antennas, stirring devices, scattering, or diffusing devices are necessary. Here, it is desirable to apply the microwave energy directly to the product in a uniform flow and not to disrupt or randomly scatter the energy.

Figure 4:
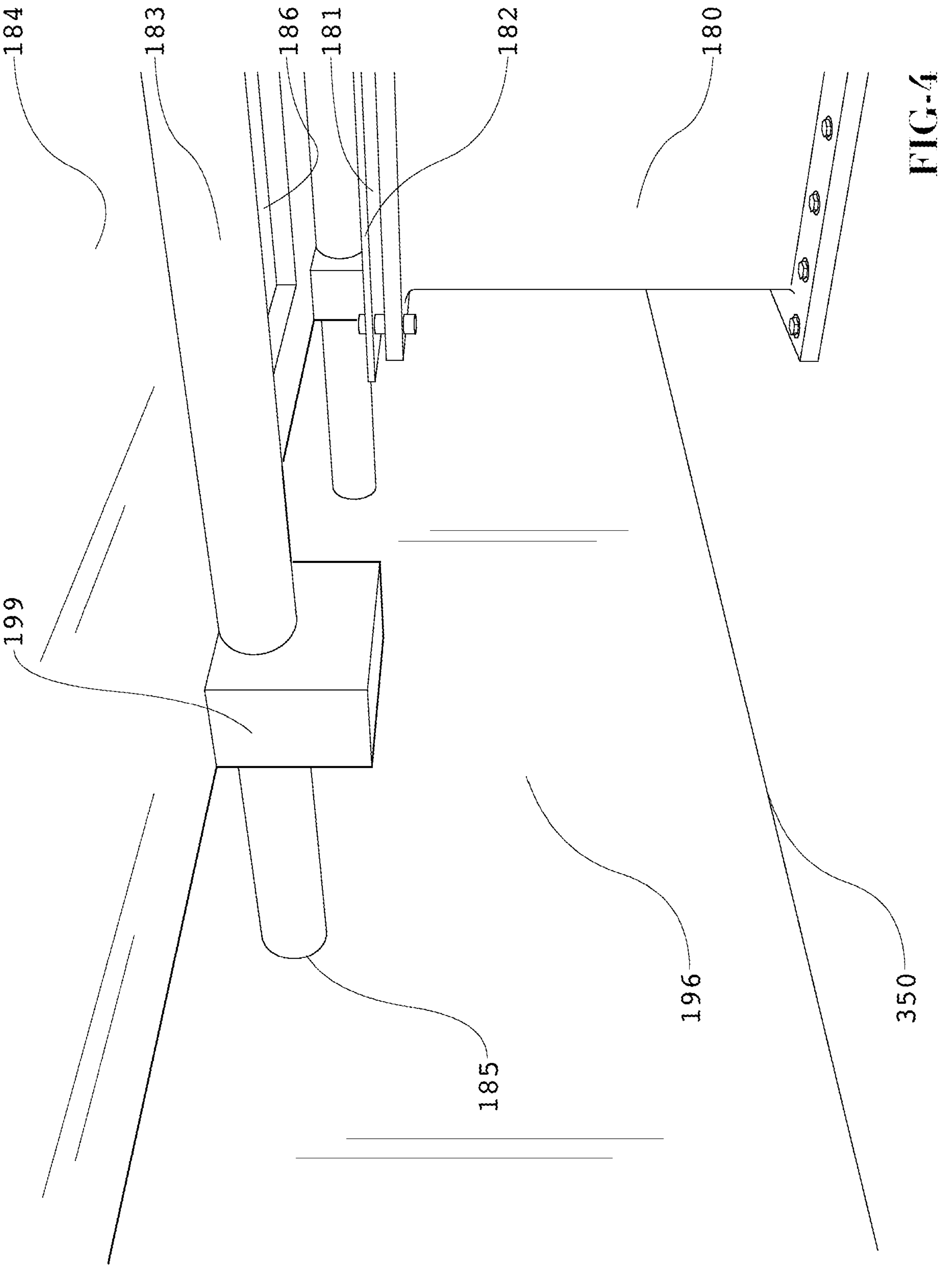
FIG. 4 is a perspective view of the interior of an exemplary oven showing the supporting elements and their attachment to the conveyor support sheet and oven walls.

FIG. 4 is a perspective view of the interior of an exemplary oven showing the supporting elements 183 and their attachment to the conveyor support sheet 184 and oven walls. The supporting element 183 meets the sidewall 196 of the oven cavity at edge 185. Preferably, the supporting element 183 is attached to the sidewall 196 without welding or additional edges, fasteners, or points which could disrupt the pattern of microwave energy. In this embodiment, the supporting element 183 is metallic (as well as the oven sidewall 196) and the two are fused together. An attachment block 199 may be used to fasten the conveyor support sheet 184 to the supporting element 183. Here, the attachment block 199 surrounds the supporting element 183 and fastens to the support sheet 184 using fasteners. Preferably, the attachment block 199 and any fasteners are constructed of non-lossy material. In some embodiments, the support sheet 184 may simply rest atop the supporting elements 183 or may connect directly to the supporting elements 183. In this embodiment, a cutout 186 is placed within the support sheet 184 and directly above the mouth 181 of the waveguide 180. Even though the support sheet 184 is preferably a non-lossy material, a cutout 186 may be used to further reduce any disruption in the microwave energy field coming from the mouth 181 of the waveguide 180 so that it is directly applied to the product.

Figure 5:
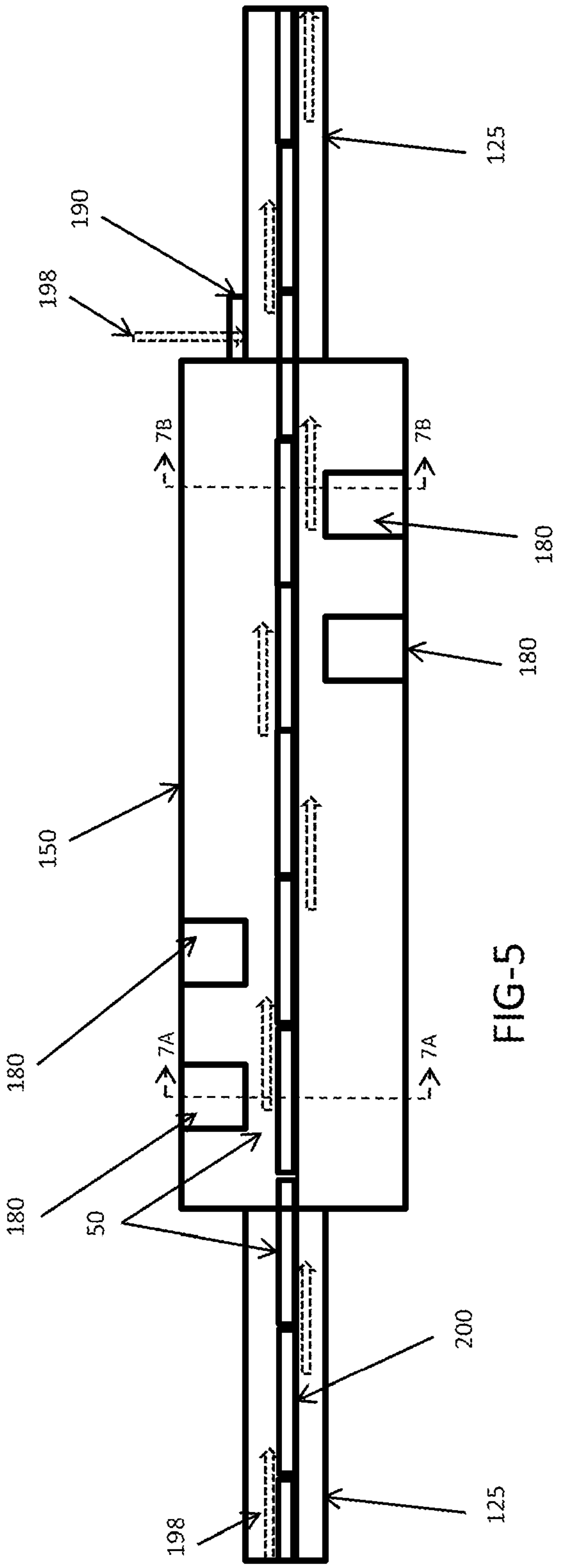
FIG. 5 is a side sectional view of an exemplary oven.

FIG. 5 shows a sectional view from the side of an oven cavity 150 and a pair of connecting tunnels 125. The conveyer 200 is shown passing through the central portion of the tunnels 125 and oven cavity 150. A plurality of containers or trays 50 are shown on the conveyer 200 and passing through the oven cavity 150. Four wave guide connections 180 are shown at four separate positions on the oven cavity 150. Air intake aperture 190 is positioned so as to draw air into the oven cavity 150. In an exemplary embodiment the air intake 190 simply draws ambient air into the oven cavity 150 without having to heat or cool the air before introducing it into the oven cavity 150.

The trays 50 are preferably comprised of a non-lossy material so that they do not absorb any of the microwave energy within the oven cavity 150 and obstruct the microwave energy field in only a minimal way. An exemplary tray 50 would be made of polycarbonate plastic or polypropylene plastic or any other non-lossy (ie. microwave transparent) material. It may be preferably to include a lid with each tray 50, so that the heat (and sometimes steam) which is generated by the microwave energy may be maintained within the tray 50 to further heat the product.

An exemplary oven allows for a single source of microwave energy to be split into four separate waveguides 180 so that the energy is applied gradually and in a highly controlled manner. Of course, ovens may be designed which use a first source of microwave energy for the top waveguides while using a second source of microwave energy for the bottom waveguides. However, exemplary results have been found for heating foodstuff by using magnetron tubes generating 60 kW-70 kW and dividing this four times for four separate waveguides. Of course, other magnetron tube sizes can be used to accommodate different processes and products.

Also shown in this figure are cutting lines 7A and 7B. Cutting line 7A travels through one of the top waveguides 180 and cutting line 7B travels through one of the bottom waveguides 180. The sectional views from these cutting lines are discussed below in FIGS. 7A and 7B.

Figure 6:
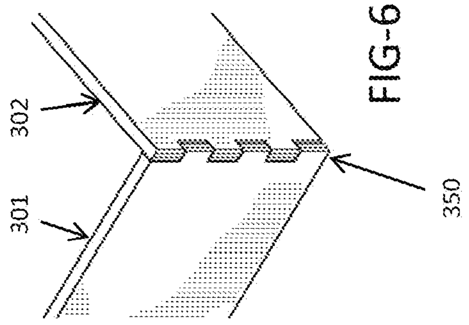
FIG. 6 is a perspective view of an exemplary edge seam for an oven.

FIG. 6 is a perspective view of an edge seam 350 for an exemplary oven cavity. To prevent microwave energy from being absorbed by the oven cavity itself, it may be important to construct the oven cavity so that the interior surfaces are smooth and are at right angles to one another. Welding on the interior surfaces of the oven cavity may also be undesirable as it can absorb or otherwise disrupt microwave energy. If the interior surfaces are smooth and contain right angles, the electromagnetic waves will bounce off rather than be absorbed.

With this principle in mind, it may be important to construct the edge seams 350 in a manner similar to that shown in FIG. 6. Here, two plates 301 and 302 are being attached along an edge seam 350. In this embodiment, plate 301 contains a square-wave edge and plate 302 contains a corresponding square-wave edge such that the two plates 301 and 302 may be connected to form a smooth right-angle edge seam. In an exemplary embodiment the plates may be steel or stainless steel and the square-wave edges may be laser cut. The two square-wave edges may be fused together. It may be preferable to create each interior edge seam in the oven cavity with this technique.

Figure 7A:
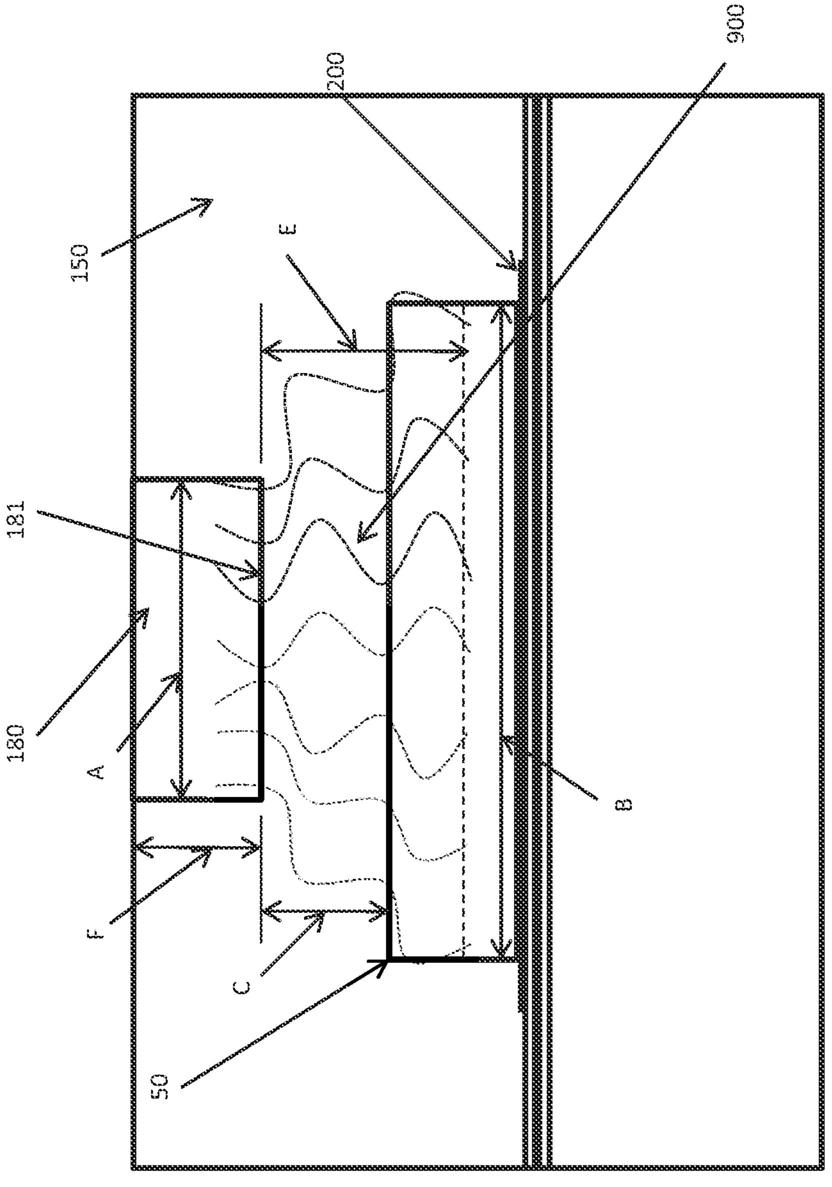
FIG. 7A is a front sectional view along section 7A-7A in FIG. 5.

FIG. 7A is a front sectional view along section 7A-7A in FIG. 5. Again, the conveyer 200 is shown passing through the central portion of the oven cavity 150. A container or tray 50 is shown on the conveyer 200 and passing through the central portion of the oven cavity 150. A top waveguide 180 is shown where the waveguide mouth 181 is located at distance F from the top of the oven cavity. Dimension F may be selected so that the waveguide mouth 181 is far enough from the top of the oven cavity so that the microwave energy field is not disturbed. It has been found that 6 inches or more for dimension F is typically acceptable, but 12 inches or more is preferable.

Dimension A denotes the width of the waveguide mouth 181 and dimension B denotes the width of the tray 50. Dimension E denotes the vertical distance from the bottom of the waveguide mouth 181 to the centerline of the tray 50. Dimension C denotes the vertical distance from the bottom of the waveguide mouth 181 to the top of the tray 50. The width dimensions A and B are taken perpendicular to the direction that the tray 50 is travelling within the oven cavity 150. In other words, in FIGS. 7A and 7B, the tray 50 is shown as travelling into the page and the widths A and B are thus taken in a direction perpendicular to the direction of travel of the tray 50.

As the microwave energy waves 900 exit the waveguide mouth 181, they are permitted to propagate and thus expand to cover a larger area. Therefore, in an exemplary design, A would be less than B so that as the waves 900 propagate they will cover the entire tray 50. Ideally, the area covered by the propagating waves 900 would be roughly equal to the area of the tray 50 so that the majority of the waves 900 are absorbed by the product within the tray and are not permitted to avoid the product and bounce around inside the oven. Of course, there will likely be some stray microwave energy waves which will avoid the product, but in an exemplary design this should be minimized. The widths A and B should be balanced with the vertical distance that the waves are permitted to propagate before contacting the tray, either distance E (to the centerline of the tray) or distance C (to the top of the tray). As an example, for a given A, E should be roughly equal to 0.75 A-1.5 A, and B should be roughly equal to 1.25 A-3 A.

Preferably, the product travels over or under one waveguide at a time and travels directly in front of the mouths of the waveguides. Ideally, the product is isolated within the central portion of the oven cavity so that the sidewalls of the oven do not disturb the pattern of microwave energy. In this manner, the microwave energy is focused and applied directly to the product and is not given a chance to bounce all around the oven and strike the product in a random manner. Preferably, the product absorbs all of the microwave energy and there is little or no loss of microwave energy, either out of the oven or due to absorption into oven components. The exemplary embodiments create a uniform field of microwave energy that is applied in a uniform and repeatable manner directly to the product.

Figure 7B:
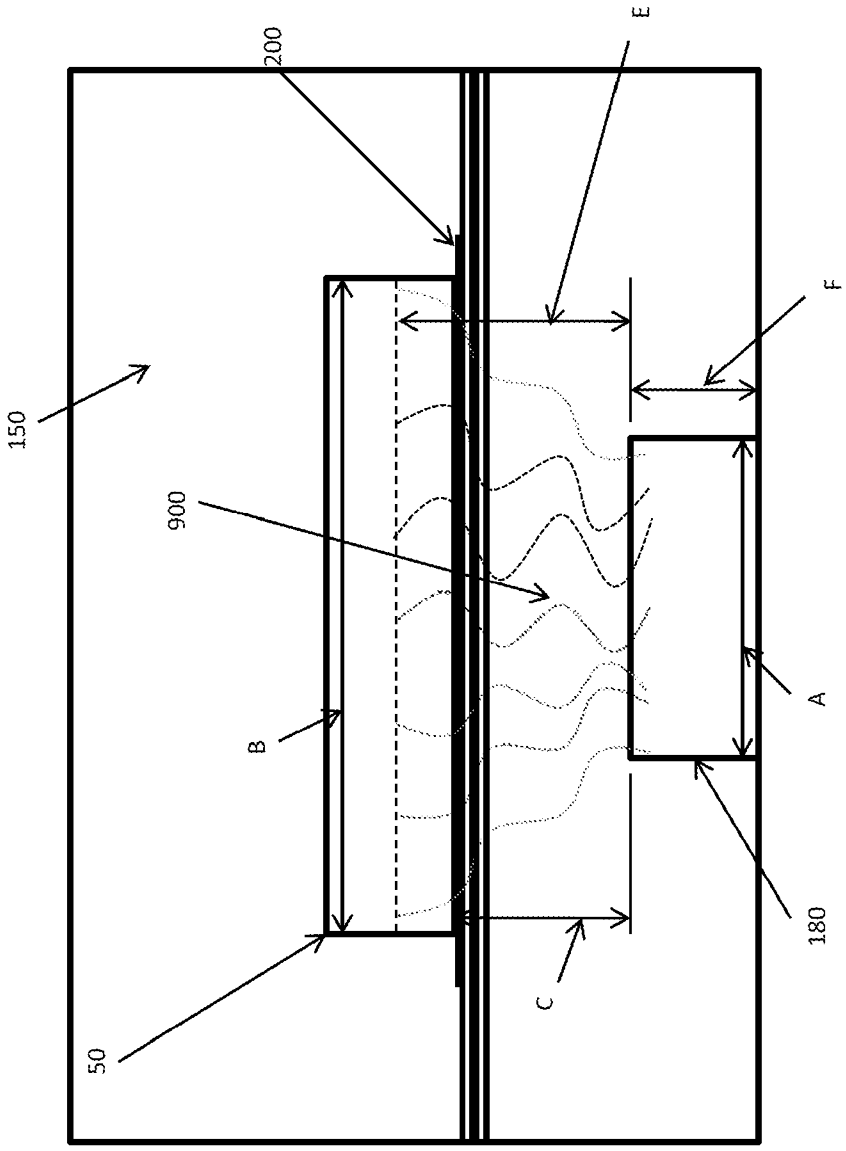
FIG. 7B is a front sectional view along section 7B-7B in FIG. 5.

FIG. 7B is a front sectional view along section 7B-7B in FIG. 5. This figure shows a similar view as shown in FIG. 7A above, with the primary exception that the waveguide 180 is shown below the tray 50 rather than above. In an exemplary embodiment, the dimensions shown here in FIG. 7B should be roughly equal to those shown in FIG. 7A. While there may be slight variations, having similar dimensions regarding the top and bottom waveguide applications allow the product to absorb microwave energy (and thus heat) in a uniform manner. In general, the guidelines given above for dimensions A, B, and E, if followed can achieve an acceptable result even though there may be variations between top and bottom waveguide applications.

Figure 8:
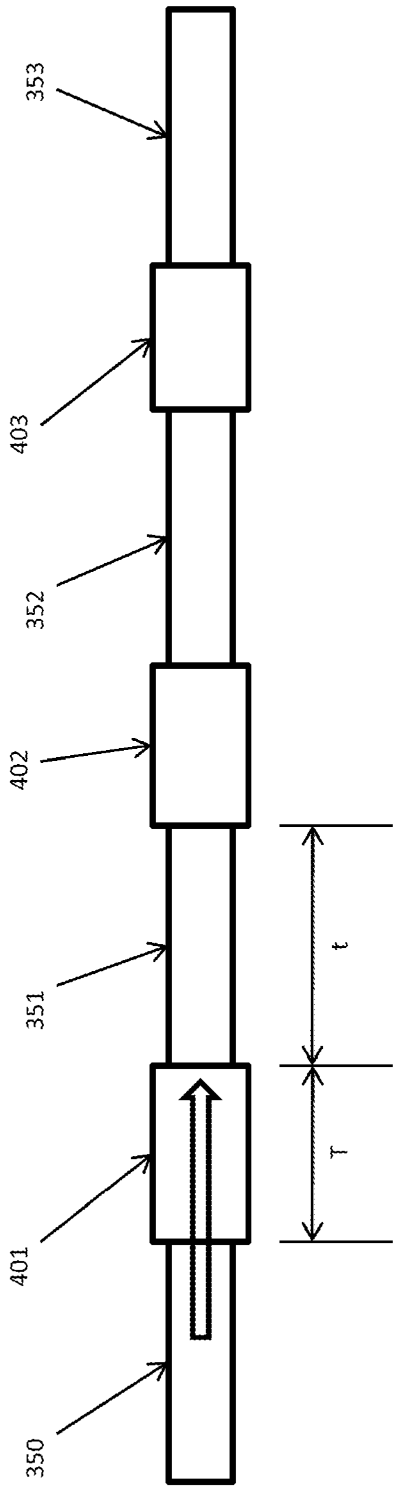
FIG. 8 is a top view of one embodiment for a system of ovens.

FIG. 8 is a top view of one embodiment for a system of ovens. In this embodiment, three ovens 401, 402, and 403 are placed in series with tunnels 351 and 352 in between. A beginning tunnel 350 as well as an exit tunnel 353 are also shown connected to the first and last ovens 401 and 403. As is known in the art, after microwave energy has been applied to a product it may continue to heat even after the microwave energy has been removed. This is a byproduct of dielectric heating. Thus, while microwave energy may only be applied in the ovens 401, 402, and 403, the product may continue to heat up as it travels through tunnels 351, 352, and 353. An exemplary embodiment takes advantage of this phenomenon and allows the product to slowly heat up so that minimal damage may be done to the cell structure and any nutritional value in the product (if a foodstuff). Thus, each oven applies a specific amount of microwave energy while the product is allowed to 'relax' while travelling in the tunnels in-between ovens. In an exemplary embodiment, a product may spend at least twice as much time (t) in relaxation as compared to the time (T) within the previous oven cavity. It has been discovered that this ratio provides a good balance of process speed and minimal damage to the product. Of course, longer relaxation times (t) may be used and it will not harm the product. However, longer relaxation times (t) may increase the overall size of the system and/or the total process time.

Figure 9:
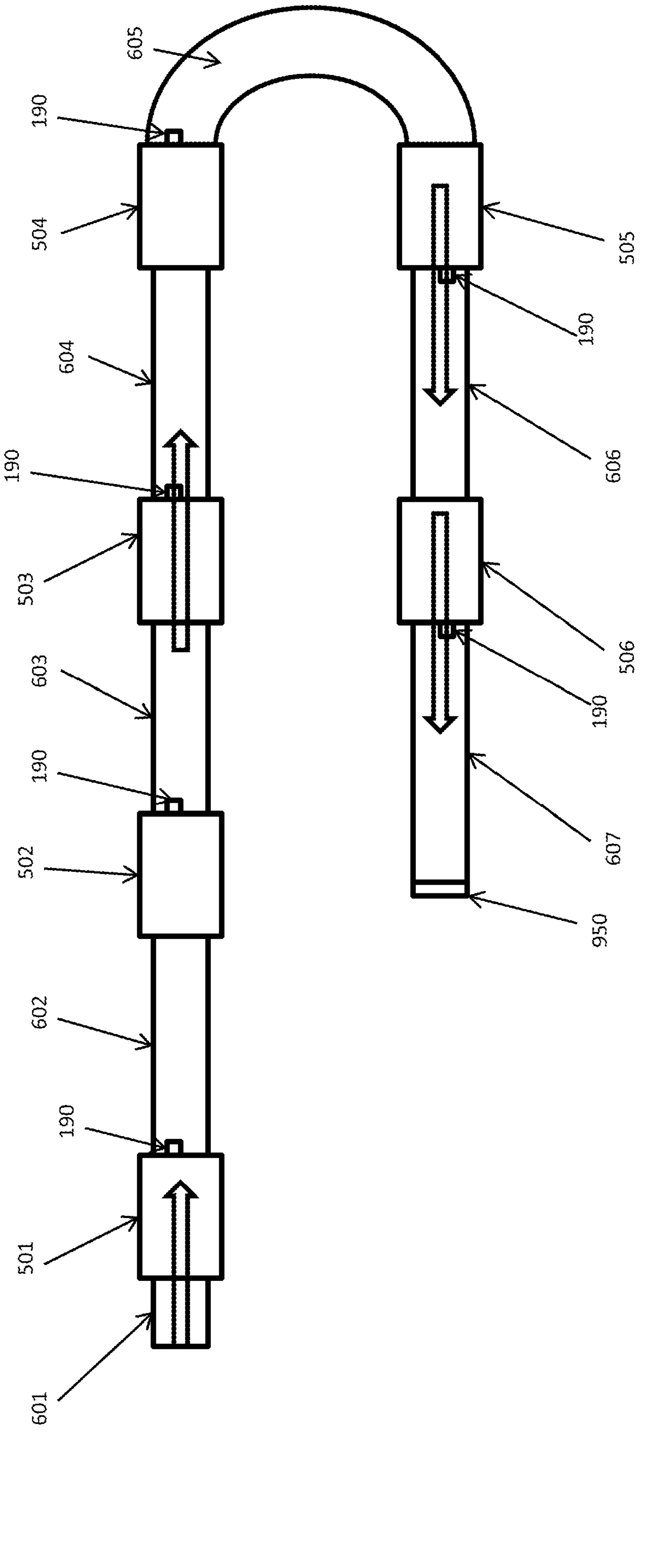
FIG. 9 is a top view of an exemplary embodiment for pre-cooking potatoes.

FIG. 9 is a top view of an exemplary embodiment for a microwave system and method for pre-cooking diced potatoes. In this embodiment, a total of six ovens 501, 502, 503, 504, 505, and 506 are connected in series. Relaxation tunnels 602, 603, 604, 605, 606, and 607 are placed between adjacent ovens. Air intakes 190 are shown attached to each oven while a single air exhaust 950 is shown after the final relaxation tunnel 607. It has been found that moving air throughout the system of ovens in this way helps the electromagnetic field/pattern within the ovens. For example, by providing a steady stream of air movement through the ovens, it is more difficult for water vapor to form within the ovens and absorb microwave energy or disrupt the pattern of microwave energy waves within the oven.

In this embodiment, the trays or containers of product remain in the same orientation as they travel through most of the tunnels. However, it has been found that rotating the trays by 90 degrees while traversing relaxation tunnel 605 provides a more-even distribution of microwave energy as the product then travels through the second half of the system (ovens 505-506). Photo-eye or laser detection devices may be placed at the entrance to each oven to ensure that trays full of product will in fact be entering the oven at the determined pace. If an oven is operating and there is no product (or something else to absorb the microwave energy) within the oven, the microwave energy may be reflected back the wave guides and into the microwave energy source. This can damage or destroy the microwave energy source. Thus, if any photo-eye or laser detection device shows that nothing is about to enter the oven, the system may shut down to avoid damaging the ovens.

It should be noted that conveyers may be designed for any system to accomplish the desired product heating process. For example in FIG. 9, a single conveyer may traverse through the entire system. Alternatively, a different conveyer may be used to travel through each oven and each relaxation tunnel. This may be desirable as it would provide speed (time) control over each portion of the process. Further, any combination of conveyers may be used perhaps where a single conveyer serves ovens 501, tunnel 602, and oven 502; while a second conveyer serves the remaining ovens and tunnels in the system. It should also be noted that potatoes have only been provided as an example, but are not required for any exemplary embodiment of the invention as any product may be used.

For an exemplary embodiment of FIG. 9, a separate conveyer may be used for each oven so that the cooking time can be accurately controlled. When designing an embodiment for cooking diced potatoes, the following parameters have been found to be acceptable: each oven should provide 60 kW-75 kW (divided four times and applied at four points—two above and two below), the speed for each oven can vary between 10-22 ft/min, and each tray should preferably contain 15-25 lbs of potatoes.

Figure 10:
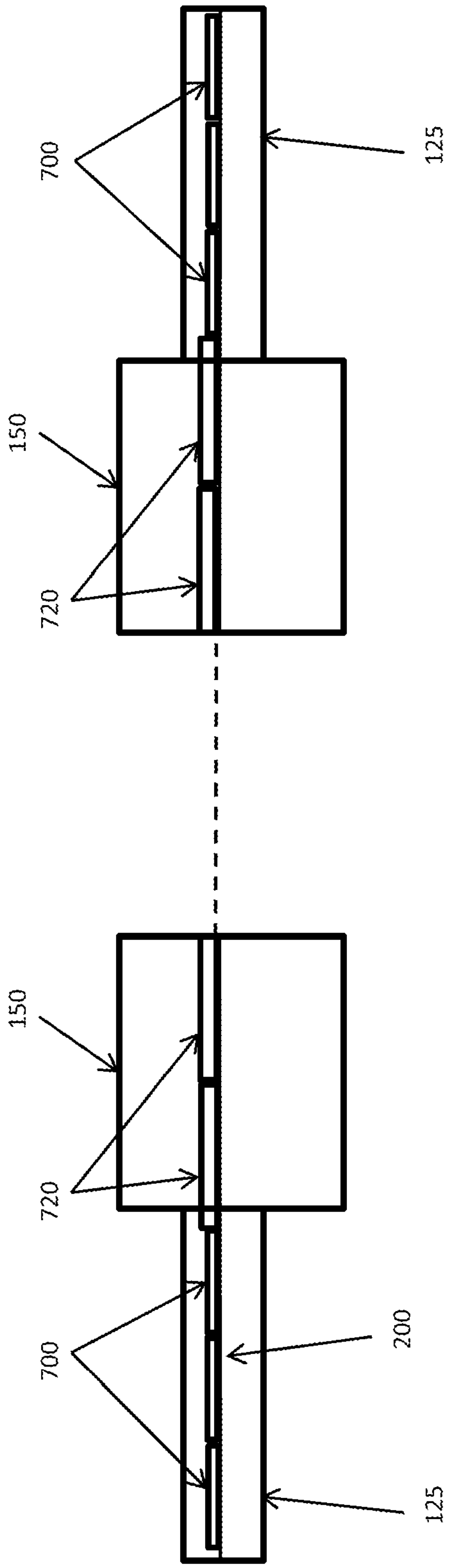
FIG. 10 is a side sectional view of an embodiment for ramping the ovens up and down between operating cycles.

To maximize efficiency and prevent damage to the microwave energy source (typically magnetrons), each oven may be slowly ramped up and down into operation before and after each process cycle. An example of this process for a single oven is shown in FIG. 10. A typical magnetron may be designed to produce a specific output of microwave energy and this may be an important aspect of the system to control. However, to avoid damage to the magnetron and to increase its operating life, it may be desirable to gradually ramp the magnetron up to its operating energy output as well as gradually ramp the magnetron down after the process cycle is complete. However, as mentioned above, an oven should not be operated while there is nothing within the oven to absorb the microwave energy as this can cause damage to the magnetron and associated oven components. Further, it may be undesirable to run product through the ovens during this ramp up/down phase as the product will not be adequately heated and may likely become waste. Thus, it has been found that dummy loads 700 may be run through an oven during ramp up and ramp down processes to ensure that the magnetron can safely increase to and decrease from its operating energy level. Therefore, an exemplary process may run dummy loads 700 through the system before and following the actual product 720. The dummy loads 700 may simply be water contained within a non-lossy container.

Exemplary embodiments can be used to fully cook foodstuff product, as compared to many previous designs which could only be used to thaw, temper, or partially cook a foodstuff product. The embodiments herein allow all of the microwave energy to be absorbed into the food with no loss of microwave energy, resulting in a uniform cook and high efficiency. The exemplary embodiments of the ovens described herein do not contain hot spots or cold spots and thus provide a uniform field of microwave energy directly to the product. The embodiments herein can be used in any heating process for a variety of products, not limited to foodstuff.

Having shown and described preferred embodiments, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed:

1. A system for applying microwave energy to a product comprising:

a cavity having a central portion and a pair of opposing sidewalls;

a plurality of support elements each attached to and between the pair of opposing sidewalls;

a conveyor extending through the central portion of the cavity, wherein the conveyor is supported by the plurality of support elements and extends perpendicularly thereto;

a top waveguide directing a first portion of the microwave energy toward the conveyor from above; and a bottom waveguide directing a second portion of the microwave energy toward the conveyor from below.

2. The system of claim 1, further comprising a support sheet extending horizontally across and supported by at least two support elements of the plurality of support elements, and wherein the conveyor is supported by the support sheet.

3. The system of claim 2, further comprising at least one attachment block connected to each of the support elements in the plurality of support elements, wherein the at least one attachment block supports the support sheet.

4. The system of claim 3, wherein each of the at least one attachment blocks are made of non-lossy material.

5. The system of claim 3, wherein each of the at least one attachment blocks surrounds a support element in the plurality of support elements and is fastened to the support sheet with a fastener.

6. The system of claim 2, wherein the support sheet is made of non-lossy material.

7. The system of claim 6, wherein the support sheet further comprises a cutout aligned with the bottom waveguide.

8. The system of claim 1, wherein each of the support elements in the plurality of support elements has a circular cross-section.

9. The system of claim 1, wherein each of the support elements in the plurality of support elements are made of non-lossy material.

10. The system of claim 1, wherein each of the support elements in the plurality of support elements are made of lossy material, have a circular cross-section, and are fused to the pair of opposing sidewalls.

11. The system of claim 1, wherein each of the support elements in the plurality of support elements have a circular cross-section.

12. The system of claim 1, wherein each of the support elements in the plurality of support elements are fused to the pair of opposing sidewalls.

13. The system of claim 1, wherein each waveguide directs microwave energy toward the conveyor through a rectangular waveguide mouth outlet having a first width measured perpendicular to the conveyor and a second width measured parallel to the conveyor and bottom waveguide.

14. The system of claim 13, further comprising a tray in which the product is carried, wherein the tray is carried by the conveyor, and has a centerline and a width measured perpendicular to the conveyor.

15. The system of claim 14, wherein the first width of the waveguide mouth outlet is less than the width of the tray.

16. The system of claim 14, wherein the first width of the waveguide mouth outlet is between 33% and 80% of the width of the tray.

17. The system of claim 14, wherein the waveguide mouth outlet is positioned at a distance from the centerline of the tray, and the distance is between 75% and 150% of the first width of the waveguide mouth outlet.

18. The system of claim 14, wherein the tray is made of a non-lossy material.

19. The system of claim 14, wherein the tray further comprises an interior and a lid, and is made of polycarbonate plastic or polypropelene plastic.

20. A system for applying microwave energy to a product comprising:

a cavity having a central portion and a pair of opposing sidewalls;

a plurality of support elements each attached to and between the pair of opposing sidewalls, where each support element is comprised of a non-lossy material;

a conveyor extending through the central portion of the cavity, wherein the conveyor is supported by the plurality of support elements;

a top waveguide positioned above the conveyer; and a bottom waveguide positioned below the conveyer.

* * * * *